United States Patent
Stevens et al.

(10) Patent No.: US 8,041,902 B2
(45) Date of Patent: Oct. 18, 2011

(54) DIRECT MEMORY MOVE OF MULTIPLE BUFFERS BETWEEN LOGICAL PARTITIONS

(75) Inventors: Jerry Wayne Stevens, Raleigh, NC (US); Alexandra Winter, Schwieberdingen (DE); Thomas D. Moore, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 12/013,276

(22) Filed: Jan. 11, 2008

(65) Prior Publication Data

US 2009/0182927 A1    Jul. 16, 2009

(51) Int. Cl.
*G06F 13/00* (2006.01)
*G06F 13/28* (2006.01)
*G06F 15/16* (2006.01)
*G06F 3/00* (2006.01)
*G06F 5/00* (2006.01)

(52) U.S. Cl. .................. 711/154; 709/245; 710/39
(58) Field of Classification Search .................. 711/154; 709/245; 710/39
See application file for complete search history.

(56) References Cited

U.S. PATENT DOCUMENTS

| 5,452,455 A | 9/1995 | Brown et al. |
| 6,332,171 B1 * | 12/2001 | Baskey et al. ................ 710/39 |
| 7,089,457 B2 | 8/2006 | Stevens |

OTHER PUBLICATIONS

Hatfield, Brian, Demystifying the System z mainframe, Oct. 20, 2009, http://willidh.wordpress.com/2009/10/20/brian-hatfield-demystifying-the-system-z-mainframe/.*

* cited by examiner

*Primary Examiner* — Edward J Dudek, Jr.
(74) *Attorney, Agent, or Firm* — Convergent Law Group LLP

(57) ABSTRACT

A method, apparatus and program product are provided for moving data from a source memory zone to a target memory zone of a computer. A source host operating system invokes a synchronous multiple move command for SBAL output buffers with a common target zone. The machine firmware identifies and validates the target argument of the first SBAL, validates the target zone state, moves the data associated with the first SBAL to the target zone; and then iteratively moves the data associated with the remaining SBALs to the target zone.

15 Claims, 4 Drawing Sheets

DIRECT MEMORY MOVE OF MULTIPLE BUFFERS BETWEEN LOGICAL PARTITIONS

FIELD OF THE INVENTION

The invention relates generally to the field of computing and more particularly to a method, system and program product for moving data in multiple buffers from a source memory zone to a target memory zone.

BACKGROUND

A single machine or computer may be divided into logical (virtual) instances of the same machine, wherein each instance is referred to as a logical partition (LP) which can be operated independently. Various LPs may be configured for varying purposes, such as database operations, client/server operations, or separated test or production environments. Each LP will have a unique zone of memory, which is only accessible within the logical partition (i.e., zone 1 can not reference zone 2's memory). Thus, when it becomes necessary for an operation in a second zone to reference data stored in memory in a first zone, the data must first be moved from the first zone to the second zone. Each LP can communicate with other LPs as if the other LP were physically located in a separate enterprise server. This communication is carried out using an internal implementation of a Queued Direct Input/Output (QDIO) architecture referred to as iQDIO.

Typically queues in the QDIO architecture include one-hundred twenty eight entries, each entry having a Storage Block Address List (SBAL). Ordinarily each SBAL represents a single read or write operation, whereby each SBAL includes a fixed total length (e.g., 16 k and up to 64 k) of data with N number of 4 k entries (e.g. 4 and up to 16) per SBAL. Each entry, in turn, can be referred to as a storage list entry, and can provide its length and a pointer to a memory page or frame of real storage which can include one or more data packets, each having a protocol header and associated data. The total length of the SBAL is referred to as the iQDIO frame size (typical frame sizes include 16 k, 24 k, 40 k, 64 k).

The Signal Adapter Write instruction (SIGA-w) described by the QDIO Architecture on the IBM system z platform can move (copy) data from the memory of a source LP's zone to the memory of a target LP's zone. This memory to memory move is a very powerful function for machines that are divided into more than one LP.

The SIGA-w move function allows only a single list of buffers to be moved for an invocation of the instruction. As previously described, this list of write buffers is associated with an output SBAL. For every output SBAL that is moved, the SIGA-w instruction must be re-invoked. This re-invocation requires that all of the overhead associated with initializing and setting up a source zone to target zone data move must be repeated each time the instruction is invoked. This overhead can be a significant driver of CPU cost and latency associated with the data movement. The cost and latency become increasingly apparent in applications that move large objects or files.

SUMMARY

A method, apparatus and program product are provided for moving data from a source memory zone to a target memory zone of a computer. A source host operating system invokes a synchronous multiple move command for SBAL output buffers with a common target zone. The machine firmware identifies and validates the target argument of the first SBAL, validates the target zone state, moves the data associated with the first SBAL to the target zone; and then iteratively moves the data associated with the remaining SBALs to the target zone. The machine firmware iterates the move step, moving each subsequent source SBAL to the target zone bypassing the initial setup steps required to prepare for the data movement. This method represents a substantial saving of machine cycles to move the same amount of data as compared to moving each SBAL with a single move SIGA-w operation.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

Figure 1:
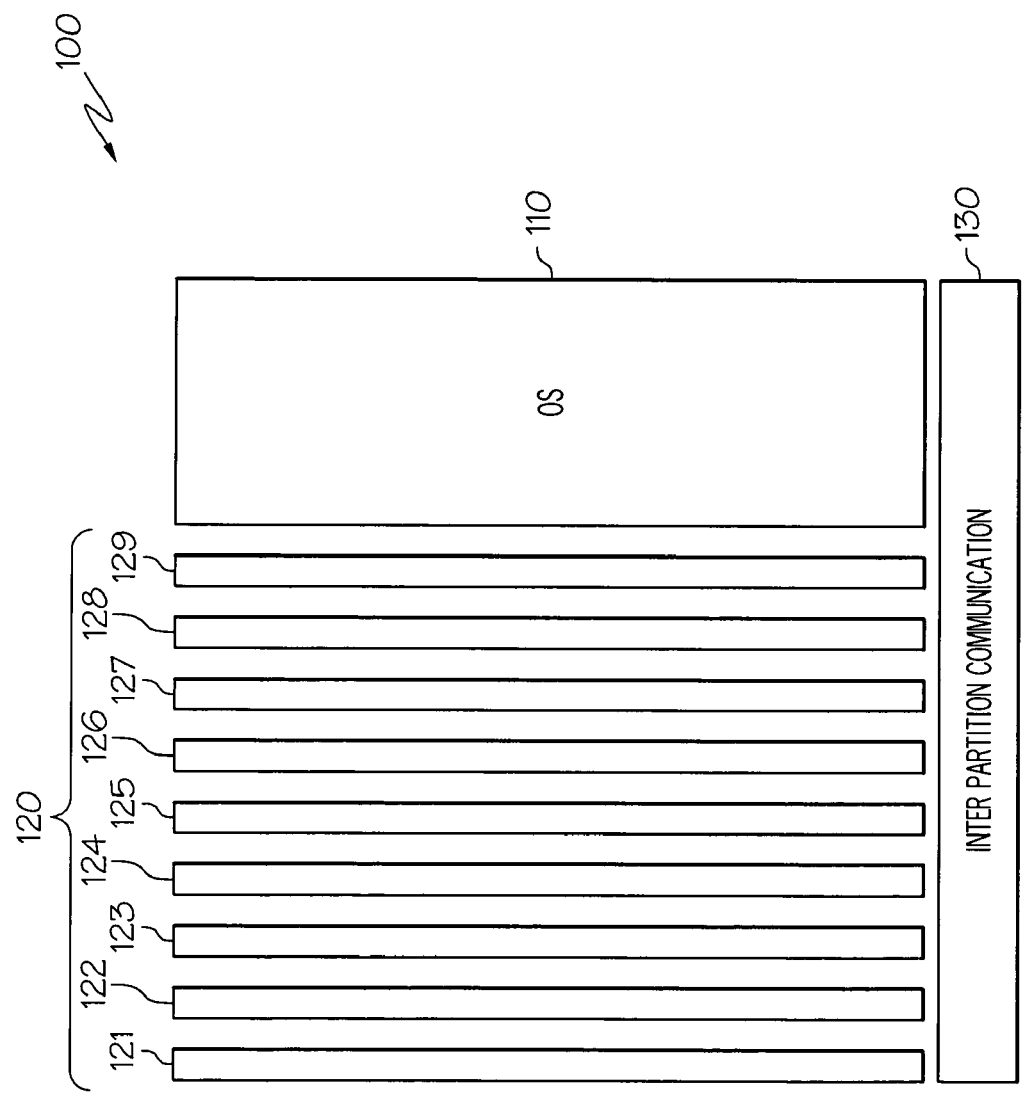
FIG. 1 is a block diagram of a computer system using multiple instances or partitions supporting inter-partition communication according to an exemplary embodiment of the invention.

The present invention provides a method, apparatus and program product for moving data from multiple buffers at a source memory zone to a target memory zone in a synchronous communication with a single operation. According to an exemplary embodiment, a large volume of data associated with a plurality of SBALs is transferred with a single invocation of a move command.

Currently, to move data from a source target zone to a target zone, the following six steps must occur. (1) The source host operating system (OS, i.e., device driver) prepares a single output buffer (e.g., a SBAL). (2) The source host OS invokes a move instruction (e.g., SIGA-w) pointing to the prepared output SBAL. (3) The machine firmware identifies and validate the argument associated with the target zone (i.e., determine whether or not the target argument (IP address, MAC address, etc) is valid). (4) The machine firmware resolves the argument to a zone (i.e., determine whether or not the target zone is findable using this argument). (5) The machine firmware validates the target zone's states (i.e. determine whether or not the zone is active and whether or not the target queue point can accept data). (6) The machine firmware moves the data associated with the single SBAL to the target zone. Then, if an operation requires moving additional buffers of data (SBALs) the six steps listed above are repeated for each SBAL.

In contrast, an exemplary embodiment of the present invention allows a system to move multiple buffers of data without repeating the entire process for each buffer. Specifically, the process according to an exemplary embodiment, comprises the following steps. (1) The source host operating system (OS, i.e., device driver) prepares multiple output buffers (SBALs). (2) The source host OS invokes a new "multiple write" move instruction (SIGA-wm) pointing to the first prepared output SBAL. (3) The machine firmware identifies and validate the argument associated with the target zone (i.e., determine whether or not the target argument (IP address, MAC address, etc) is valid) for the first SBAL. (4) The machine firmware resolves the argument to a zone (i.e., determine whether or not the target zone findable using this argument?). (5) The machine firmware validates the target zone's states (i.e., determine whether or not the zone is active and whether or not the target queue point can accept data. (6) The machine firmware moves the data associated with the first SBAL to the target zone. (7) The machine firmware then iterates the last step moving each subsequent source SBAL to the target zone bypassing the initial setup steps required to prepare for the data movement.

In an exemplary application, 128 output SBALs must be moved. In the existing method there is a total of 768 combined software (host operating system) and firmware steps (operations) to move 128 SBALs (i.e. 256 software steps (128×2 (steps (1) and (2))+512 firmware steps (128×4 (steps 3, 4, 5 and 6)) firmware steps are required to move the 128 SBALs.

By contrast, in the exemplary embodiment of the invention only a total of 260 combined software and firmware steps are required to move the same 128 SBALs, representing a total savings of 508 steps (i.e. 129 software steps (step 1×128+1 time for step 2 (one SIGA-wm))+131 firmware steps (4 (all four of steps 3, 4, 5 and 6 for the first SBAL)+127 steps (step 6×127 remaining SBALs)) This method represents a substantial saving of machine cycles to move the same amount of data.

Referring to FIG. 1, a machine or computer 100 is divided into logical (virtual) instances of the same machine. These instances are referred to as logical partitions (LP) 121-129 (collectively 120) which can be operated independently. While each LP will have a unique zone of memory, which is only accessible within the logical partition, data stored in memory in a first zone may be moved from the first zone to the second zone using inter-partition communication 130. In the present exemplary embodiment, this inter-partition communication takes the form of internal Queued Direct Input/Output (iQDIO) architecture. The machine 100 further comprises an operating system 110, such s z/OS, which supports inter-partition communication.

Figure 2:
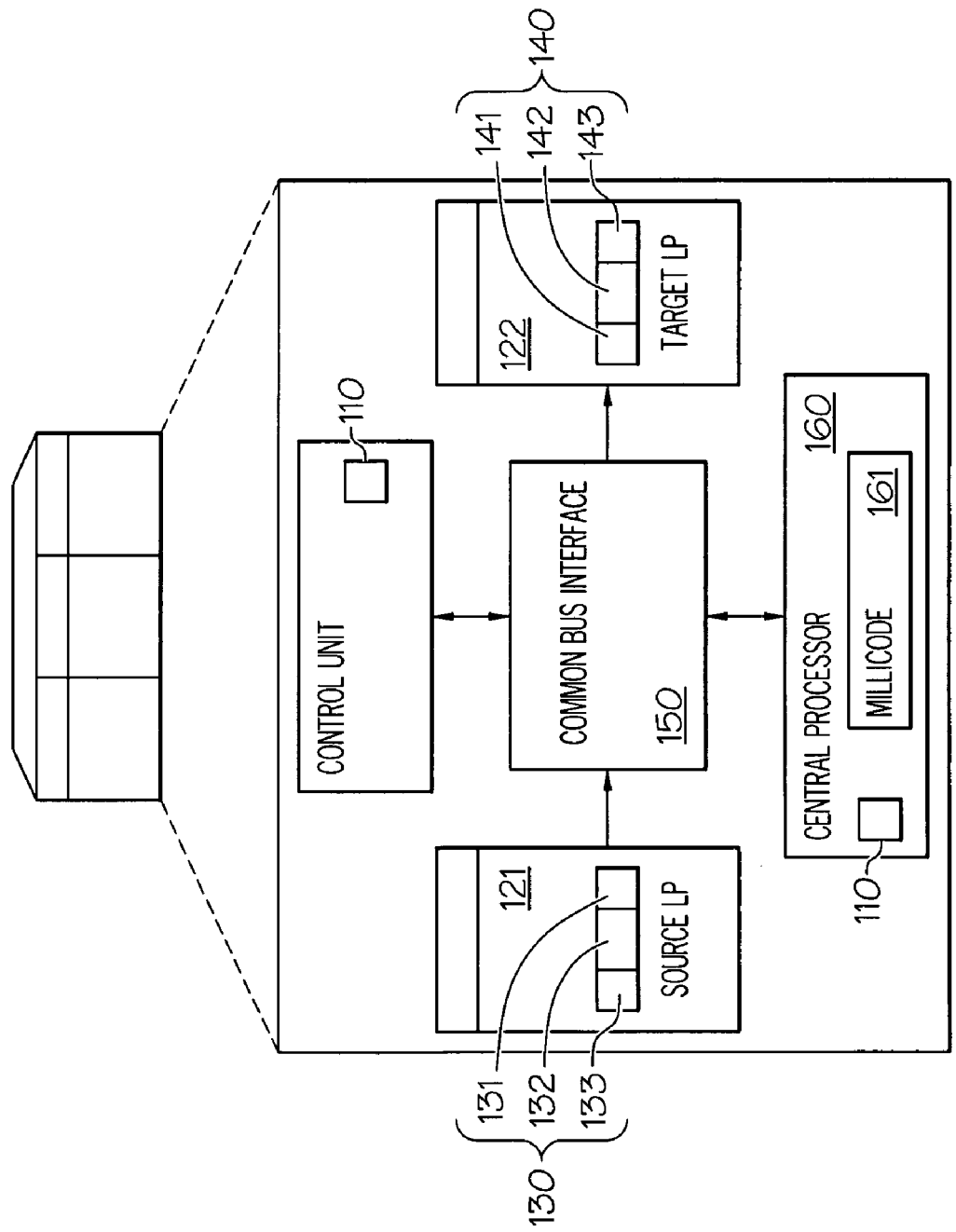
FIG. 2 is a block diagram of a QDIO-enabled server configured with a multiple move function according to an exemplary embodiment of the invention.

Connectivity is shown between two LPs 121, 122 within the same machine using the iQDIO architecture. The LPs are configured to use the same channel path ID (CHPID). An iQDIO logical device 130, 140 is configured within each LP 121, 122. This logical device is referred to as a "subchannel address". The subchannel addresses may include an inbound (receive) queue and multiple outbound (send) queues. In the illustrated exemplary embodiment, subchannel address 130 comprises an inbound queue 131 and outbound queues 132, 133. Subchannel address 140 comprises an inbound queue 141 and outbound queues 142, 143. It should be understood that while two outbound queues are shown for the subchannel addresses of FIG. 2, outer quantities of outbound queues are also possible. These queues allow the subchannel address to simultaneously send and receive data through the iQDIO hardware.

The LPs 121, 122 are interconnected through a common bus interface 150. A control unit 110 and a central processor 160 running millicode 161 and operating system (OS)110 are also interconnected to the LPs 121, 122 through the common bus interface 150. The operating system in an exemplary embodiment is z/OS, however other operating systems may be used to practice the invention.

Figure 3:
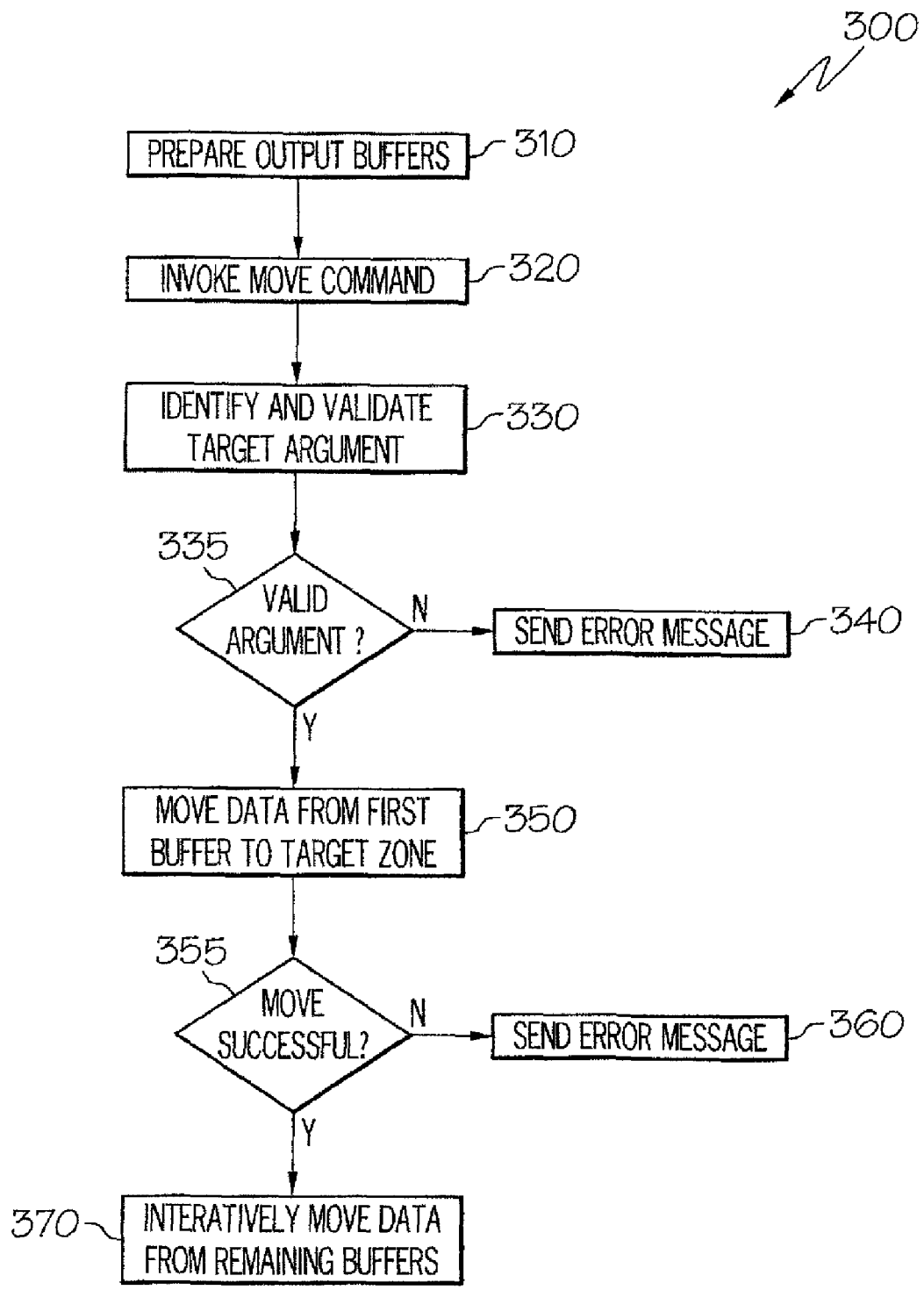
FIG. 3 is a flow diagram of a method for moving data from a source memory zone to a target memory zone of a computer according to an exemplary embodiment of the invention.

In order to transfer data from the source or sending LP 121 to the target LP 122, the central processor (CP) 160, executes a process 300 illustrated in FIG. 3. The CP 160 prepares input and output SBALs (step 310). In order for the target LP 122 to receive data packets from the source or sending LP 121, the central processor 160 queues SBALs in an inbound queue 142 of the target LP 140, thereby making read buffers associated with the target LP available for use by the iQDIO hardware. The CP 160 also queues SBALs in an outbound queue 131 of the source LP 130 and sets the output SBALs to a primed state.

After the input and output SBALs are prepared, the source LP 121 invokes a multiple move command (step 320). In an exemplary embodiment the multiple move command is a SIGA-wm command indicating that multiple SBALs will be moved. In an exemplary embodiment the sending host explicitly indicates that the move is for multiple SBALs (and not for a single SBAL). The sending host may indicate the multiple move by providing a unique SIGA function code, such as a general register function code of 0x0000003 (Function Code 3), for example.

The SBALs must designate the same target zone. In an existing single SBAL move (SIGA-w), when the SIGA-w is invoked by the host OS for a single SBAL, the host can (and typically will) pack multiple packets into the single SBAL (e.g. the SBAL might include 28 packets). The firmware does not examine the contents of the SBAL (i.e., it does not look at each individual packet). Instead, it is the source host OS's responsibility to assure that all packets contained within the write operation are destined for the same target LP. It would not be practical for the firmware to police this. Similarly, when a multiple move operation (SIGA-wm) is invoked for all output buffers built by the source host OS, then all SBALs which have been marked in the output buffer primed state must follow the same rules as for a single SBAL. That is, each SBAL must contain packets that are destined for the same target LP. Again, it is the host OS's responsibility to assure that all packets have the same target destination. Thus, SBAL packing rules have not changed, instead the rules have been extended to multiple buffers.

Next, when the CP millicode 161 sees the multiple move indication (e.g., Function Code 3), the millicode resolves the first IP address in the first SBAL (step 330). That is, it identifies the target argument and determines whether or not it is valid. It should be noted that this step is the same as for a single SBAL move command, SIGA-w.

If the argument is determined to be valid (step 335), then the CP millicode 161 moves the data associated with the first SBAL from the output queue 131 of the source LP 130 to an input queue 142, 143 of the target LP (step 350). This is also the same as for a single SBAL move command, SIGA-w.

If the argument is determined not to be valid, then the CP millicode sends an error indication in SLSB state and the SBAL error code (step 340). This is also the same as for a single SBAL move command, SIGA-w.

The CP millicode 161 then determines whether or not the move was successful (step 355). This is determined by a change in the Stored Level Status Block (SLSB) state. If the move is successful, the SLSB state is updated from prime to output buffer empty state to indicate that the move is completed. If the move is not successful, then an error code is presented (step 360). For example, Reg00 high bit on indicates "synchronous busy" where an SLSB has not been altered, as may be caused by a hardware lock that is not dropped as in normal operation. In an exemplary embodiment an error code for a SIGA write multiple limit exceeded may be sent if a limit is set on the number of SBALs that can be moved with a single command, and that number is exceeded. This may be a "temporary error" using existing CC error logic.

If the first SBAL move is successful, then the CP millicode 161 iteratively moves the remaining SBALs with a SLSB state of Output Buffer Primed (x'61') (step 370). That is, the CP millicode 161 moves the next SBAL with an SLSB state of Output Buffer Primed from an output buffer 133 of the source LP 121 to the input buffer 141 of the target LP 122. This step is repeated until there are no more SBALs in source LP 121 with an SLSB state of Output Primed.

Figure 4:
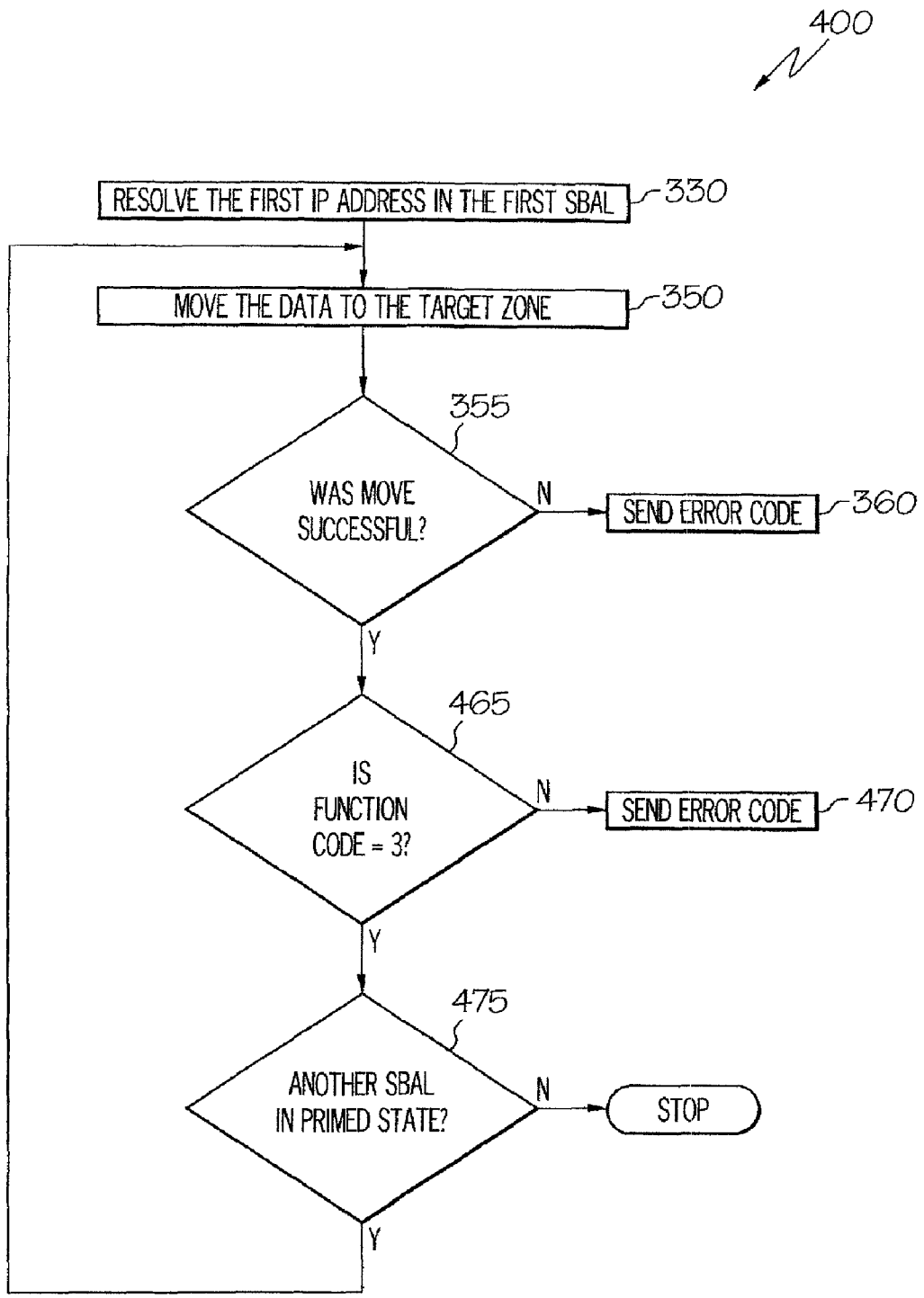
FIG. 4 is a flow diagram of a method performing a move of multiple SBALs in a Central Processor millicode according to an exemplary embodiment of the invention.

In an exemplary embodiment, the CP millicode 161 recognizes and performs a multiple move based on a unique function code such as FC3 as described above and illustrated in FIG. 4. In the illustrated embodiment, the millicode resolves the first IP address in the first SBAL (step 330) as described above. The CP millicode 161 then moves the data associated with the first SBAL from the source LP 121 to the target LP 122 (step 350), as describe above. After the data associated with the first SBAL is moved, the CP millicode 161 determines whether or not the move was successful (step 355), and if the move is not successful, the CP millicode sets an error code (step 360) as described above. If the move is determined to be successful (based on status change), the CP millicode 161 determines whether or not the general register indicates a multiple move function code (e.g., F3) (step 465). If not, the CP millicode sets an error code 470. If the general register indicates a multiple move code, then the CP millicode 161 determines whether or not another SBAL at the source LP is in the output primed state addressed to the same target LP (step 475).

If there is another SBAL in the output queue 131 of the source LP in the output primed SLSB state addressed to the target LP 122, then the CP millicode 161 moves Data associated with the next SBAL in the output queue 131 of the source LP in the output primed SLSB state addressed to the target LP 122 (step 340), without resolving the argument for the next SBAL. Thereby, invention provides a significant savings in processing time. The remaining SBALs in the output queue 131 of the source LP in the output primed SLSB state addressed to the target LP 122, will similarly be moved to the target LP 122 without resolving the arguments in an iterative process, until all SBALs in the output queue 131 of the source LP in the output primed SLSB state addressed to the target LP 122 have been moved to the target LP 122 (step 475 NO condition).

Unlike SIGA-write for OSD the IQD multiple write operation, which will process multiple SBALs will continue to execute on the current (sending) thread and processing unit (PU). The SIGA will continue to execute an interruptible synchronous instruction on the current PU. While described with reference to a standard system z CP, SIGA is not restricted to a specific CPU type, and cases are possible within the scope of this invention in which the sending thread could be executing on an IFL, zAAp or ZIIP.

After all SBALs in the output queue 131 of the source LP in the output primed SLSB state addressed to the target LP 122, the CP millicode 161 drives the target (read side) thin interrupt logic.

In an exemplary embodiment a maximum number of SBALs may optionally be specified. For example, the upper limit could be a specific number of SBALs per multiple move. Alternatively, the upper limit could be expressed in bytes or pages. The limit could also factor in the different IQD frame sizes (e.g., 16 k, 24 k, 40 k, 64 k). In an exemplary embodiment a maximum limit of 16 SBALs is permitted per multiple move (in this example a SIGA-wm) without regard to the payload size for each SBAL, the IQD frame size, or any other message attribute of the individual SBALs.

If the device driver were to exceed a specified limit on the number of SBALs per multiple move command, this could be tolerated by the CP millicode 161 and not be considered a permanent error. Instead the CP millicode 161 would simply stop processing (transmitting) SBALs at the predefined limit. All SBALs exceeding the limit would be rejected with an SLSB state of x'AF' with a unique SBALF error code indicating SIGA write multiple limit exceeded.

Under normal conditions, write completion processing is similar to existing SIGA-w processing. If all SBALs are successfully processed, the SIGA completes with Condition Code 0 (CC0) and each SLSB is updated to indicate complete (i.e., the original buffer empty state). All SBALs are then processed for write completion.

If the CP millicode 161 can only complete a subset of multiple SBALs in a multiple SBAL move, then this would be considered a partial completion. For example, a sender builds 8 SBALs, and then issues a SIGA-wm (Function Code 3) multiple move command. However, the receiving LP device queue only has 6 read SBALs (buffers) available. The first 6 SBALs are moved, but the last 2 SBALs can not be moved (transmitted). This would be a retry-able non-permanent error. All SBALs that are not processed are updated with an SLSB state of "Out of Buffer Error State" (x'AF') with an error code of target buffers not empty. For partial completion, the Condition Code 2 (CC2) "temporary error" logic will update the GPReg00 (high bit). Reg00 High Bit on indicates "synchronous busy" where some SLSBs have not been altered (i.e., one or more SLSBs remain in Output Buffer Primed state x'62). This may occur when some system firmware resource becomes unavailable between transfers of SBALs. Reg00 High Bit off indicates "asynchronous busy" where one or more SLSBs have been altered to Output Buffer Error State (x'AF').

In an exemplary embodiment, the synchronous multiple move command comprises a SIGA type bit value in the QDIO adapter characteristics byte to indicate presence of multiple move support. The indication may be, for example, a non-zero integer indicating the maximum number of SBALs that can be moved with a multiple move command.

The preceding description and accompanying drawing are intended to be illustrative and not limiting of the invention. The scope of the invention is intended to encompass equivalent variations and configurations to the full extent of the following claims.

What is claimed is:

1. A method for moving data from a source memory zone to a target memory zone of a computer, the method comprising the steps of:
   invoking a synchronous multiple move command for data associated with a plurality of Storage Block Address List (SBAL) output buffers at a source zone with a target zone;
   identifying and validating a target argument of a first SBAL;
   validating a state for the target zone;
   moving the data associated with the first SBAL from the source zone to the target zone; and
   iteratively moving the data associated with each remaining SBAL from the source zone to the target zone without validating target arguments.

2. The method of claim 1, wherein the synchronous multiple move command comprises a function code indicating a move of data associated with multiple SBALs.

3. The method of claim 1, wherein the synchronous multiple move command comprises a Signal Adapter (SIGA)

type bit value in a Queued Direct Input/Output (QDIC) adapter characteristics byte to indicate presence of multiple move support.

4. The method of claim 3, wherein the indication is a non-zero integer indicating the maximum number of SBALs whose associated data can be moved with a multiple move command.

5. The method of claim 1 wherein the source memory zone and the target memory zone are in a computer system having a z/OS architecture.

6. The method of claim 3 wherein existing error codes are used to indicate partial completion under a Condition Code 2 (CC2) Sync busy error logic.

7. A computer apparatus configured for moving data from a source memory zone to a target memory zone of a computer, comprising:
  a source logical partition;
  a target logical partition interconnected with the source logical partition;
  a control unit interconnected with the source logical partition and the target logical partition and having an operating system thereon; and
  a central processor interconnected with the source logical partition, the target logical partition and the control unit;
  whereby the apparatus operates to move data associated with multiple buffers from the source logical partition to the target logical partition by performing a method, comprising the steps of:
  invoking a synchronous multiple move command for a plurality of SBAL output buffers with a target zone;
  identifying and validating a target argument of a first SBAL;
  validating a state of the target zone;
  moving the data associated with the first SBAL from the source zone to the target zone; and
  iteratively moving the data associated with each remaining SBAL from the source zone to the target zone without validating target arguments.

8. The apparatus of claim 7, wherein the source memory zone and the target memory zone are in a computer system having a z/OS architecture.

9. The apparatus of claim 7, wherein the data is moved by millicode included in SIGA firmware.

10. A computer program product comprising a computer-readable medium having encoded thereon computer executable instructions for moving data from a source memory zone to a target memory zone of a computer, comprising:
  first computer instructions for invoking a synchronous multiple move command for a plurality of SBAL output buffers at a source zone with a target zone;
  second computer instructions for identifying and validating a target argument of a first SBAL;
  third computer instructions for validating a state of the target zone;
  fourth computer instructions for moving the data associated with the first SBAL from the source zone to the target zone; and
  fifth computer instructions for iteratively moving the data associated with each remaining SBAL from the source zone to the target zone without validating target arguments.

11. The computer program product of claim 10, wherein the synchronous multiple move command comprises a function code indicating a move of data associated with multiple SBALs.

12. The computer program product of claim 10, wherein the synchronous multiple move command comprises a SIGA type bit value in a QDIO adapter characteristics byte to indicate presence of multiple move support.

13. The computer program product of claim 12, wherein the indication is a non-zero integer indicating the maximum number of SBALs whose associated data can be moved with a multiple move command.

14. The computer program product of claim 10 wherein the source memory zone and the target memory zone are in a computer system having a z/OS architecture.

15. The computer program product of claim 12 wherein existing error codes are used to indicate partial completion under a CC2 Sync busy error logic.

\* \* \* \* \*